United States Patent
Shoshan et al.

(10) Patent No.: US 11,945,529 B2
(45) Date of Patent: Apr. 2, 2024

(54) DUAL USE TRAILER VEHICLE

(71) Applicant: Plasan Sasa Ltd., M.P. Marom Hagalil (IL)

(72) Inventors: Amir Ben Shoshan, D.N. Chevel Korazim (IL); Asaf Engel, M.P. Marom Hagalil (IL)

(73) Assignee: Plasan Sasa Ltd., M.P. Marom Hagalil (IL)

( * ) Notice: Subject to any disclaimer, the term of this patent is extended or adjusted under 35 U.S.C. 154(b) by 50 days.

(21) Appl. No.: 17/737,356

(22) Filed: May 5, 2022

(65) Prior Publication Data
US 2022/0371389 A1 Nov. 24, 2022

(30) Foreign Application Priority Data

May 10, 2021 (IL) .......................................... 283075

(51) Int. Cl.
*B62D 59/04* (2006.01)
*B60D 1/32* (2006.01)
*B60D 1/62* (2006.01)

(52) U.S. Cl.
CPC ................ *B62D 59/04* (2013.01); *B60D 1/32* (2013.01); *B60D 1/62* (2013.01)

(58) Field of Classification Search
CPC ............................... B62D 47/006; B60D 1/07
USPC .............................................. 180/14.1, 14.2
See application file for complete search history.

(56) References Cited

U.S. PATENT DOCUMENTS

| 2,962,176 | A | * | 11/1960 | Russell | ................. | E21F 13/025 |
|---|---|---|---|---|---|---|
| | | | | | | 280/460.1 |
| 3,000,651 | A | | 9/1961 | Rene | | |
| 3,353,618 | A | | 11/1967 | Gordon | | |
| 3,414,072 | A | | 12/1968 | Hodges et al. | | |
| 3,578,096 | A | | 5/1971 | Pearson | | |
| 3,612,312 | A | | 10/1971 | Behrmann | | |

(Continued)

FOREIGN PATENT DOCUMENTS

| CH | 665178 A | 4/1988 |
|---|---|---|
| CH | 705800 B1 | 6/2015 |

(Continued)

OTHER PUBLICATIONS

Bolzern , et al., "An Input-Output Linearization Approach to the Control of an n-Body Articulated Vehicle", Journal of Dynamic Systems, Measurement, and Control, Sep. 2011, pp. 309-316.

(Continued)

*Primary Examiner* — Kevin Hurley
(74) *Attorney, Agent, or Firm* — Dorsey & Whitney LLP (57) ABSTRACT

A modular slave vehicle articulatable at one end thereof to another slave vehicle and at another end thereof to an independently driven master vehicle, simultaneously. The slave vehicle comprising a body including a driving system; a structural frame supporting said body; a master coupling system in the form of a mechanical stress absorbing coupling mechanism; at least one first slave coupling device; at least one second slave coupling device; said first and second coupling devices, when mounted to two adjacent slave vehicles intended to be articulated to each other, are detachably connectable to each other to form a tandem coupling configured to constrain all DOF therebetween.

18 Claims, 8 Drawing Sheets

(56) References Cited

U.S. PATENT DOCUMENTS

| | | | |
|---|---|---|---|
| 3,669,469 A * | 6/1972 | Hartelius | B62D 53/028 |
| | | | 280/492 |
| 3,717,215 A | 2/1973 | Nigg et al. | |
| 3,899,039 A | 8/1975 | McHugh | |
| 4,033,426 A | 7/1977 | Williams | |
| 4,072,203 A | 2/1978 | Pierson | |
| 4,150,841 A * | 4/1979 | Ayotte | B62D 49/0692 |
| | | | 280/460.1 |
| 4,502,561 A | 3/1985 | Kober et al. | |
| 4,505,347 A | 3/1985 | Prechtel | |
| 4,650,018 A | 3/1987 | Silverman | |
| 4,714,264 A | 12/1987 | Woestelandt | |
| 4,771,838 A | 9/1988 | Ketcham | |
| 5,165,838 A | 11/1992 | Kallansrude et al. | |
| 5,330,020 A | 7/1994 | Ketcham | |
| 5,332,052 A | 7/1994 | Carnevale | |
| 6,336,683 B1 | 1/2002 | Akiba | |
| 6,725,955 B2 | 4/2004 | Bidwell | |
| 6,746,037 B1 | 6/2004 | Kaplenski et al. | |
| 7,115,070 B2 | 10/2006 | Stummer | |
| 7,514,803 B2 | 4/2009 | Wilks | |
| 7,547,980 B2 | 6/2009 | Harrison | |
| 7,743,859 B2 | 6/2010 | Forsyth | |
| 7,798,263 B2 | 9/2010 | Tandy | |
| 8,006,796 B1 | 8/2011 | Fontaine | |
| 8,214,108 B2 | 7/2012 | Post et al. | |
| 8,322,965 B2 | 12/2012 | Smith | |
| 8,348,708 B2 | 1/2013 | Kanerva | |
| 8,540,272 B1 | 9/2013 | Vitale et al. | |
| 8,627,908 B2 | 1/2014 | Wellborn et al. | |
| 8,820,443 B2 | 9/2014 | Ferri | |
| 8,863,866 B2 | 10/2014 | Pfister | |
| 9,022,408 B2 | 5/2015 | Nooren | |
| 9,039,029 B2 | 5/2015 | Nooren | |
| 9,073,535 B2 | 7/2015 | Jenkins et al. | |
| 9,139,225 B2 | 9/2015 | Nooren | |
| 9,321,357 B2 | 4/2016 | Caldeira et al. | |
| 9,457,666 B2 | 10/2016 | Caldeira et al. | |
| 9,566,854 B2 | 2/2017 | Kerschl et al. | |
| 9,694,712 B2 | 7/2017 | Healy | |
| 9,740,213 B2 | 8/2017 | Bick et al. | |
| 9,764,748 B2 | 9/2017 | Brooks et al. | |
| 9,802,508 B1 | 10/2017 | Healy | |
| 9,857,255 B2 | 1/2018 | Hagan | |
| 10,118,505 B2 | 11/2018 | Healy | |
| 10,384,560 B2 | 8/2019 | Healy | |
| 10,449,954 B2 | 10/2019 | Layfield et al. | |
| 10,518,831 B2 | 12/2019 | Wright | |
| 10,654,369 B2 | 5/2020 | Healy | |
| 10,752,102 B2 | 8/2020 | Lampsa et al. | |
| 2003/0090083 A1 | 5/2003 | Williams | |
| 2005/0230934 A1 | 10/2005 | Wilt | |
| 2006/0085117 A1 | 4/2006 | Stummer | |
| 2007/0120413 A1 | 5/2007 | Azocar | |
| 2008/0238138 A1 | 10/2008 | Vallee | |
| 2009/0124143 A1 | 5/2009 | Kanerva | |
| 2009/0152832 A1 | 6/2009 | Moore et al. | |
| 2010/0133780 A1 | 6/2010 | Jarvelin | |
| 2010/0181743 A1 | 7/2010 | Timmons | |
| 2011/0052290 A1 | 3/2011 | Kurakata | |
| 2011/0253463 A1 | 10/2011 | Smith | |
| 2015/0042066 A1 | 2/2015 | Nooren | |
| 2015/0042073 A1 | 2/2015 | Nooren | |
| 2015/0204741 A1 | 7/2015 | Hagan | |
| 2015/0306946 A1 | 10/2015 | Jenkins et al. | |
| 2016/0057921 A1 | 3/2016 | Pickett et al. | |
| 2017/0021881 A1 | 1/2017 | Jacobsen et al. | |
| 2017/0129558 A1 | 5/2017 | Gugel et al. | |
| 2018/0022405 A1 | 1/2018 | Gecchelin et al. | |
| 2018/0319268 A1 | 11/2018 | Mcadam et al. | |
| 2020/0062306 A1 | 2/2020 | Shoshan et al. | |
| 2020/0171899 A1 | 6/2020 | Scheer et al. | |
| 2020/0317280 A1 | 10/2020 | Lee et al. | |
| 2020/0369103 A1 | 11/2020 | Bharani | |

FOREIGN PATENT DOCUMENTS

| | | |
|---|---|---|
| CH | 705801 B1 | 6/2015 |
| CN | 201633802 U | 11/2010 |
| CN | 102582703 A | 7/2012 |
| CN | 105235548 A | 1/2016 |
| CN | 106394708 A | 2/2017 |
| DE | 2547362 A1 | 4/1977 |
| DE | 3009772 A1 | 9/1981 |
| DE | 3829638 A1 | 6/1989 |
| DE | 4324211 A1 | 1/1995 |
| DE | 10131935 A1 | 3/2002 |
| DE | 102006030347 A1 | 1/2008 |
| DE | 102010042268 A1 | 4/2012 |
| DE | 102010042270 A1 | 4/2012 |
| DE | 102012107648 A1 | 5/2014 |
| DE | 102015010749 A1 | 3/2016 |
| DE | 202015002528 U1 | 7/2016 |
| DE | 202016006076 U1 | 12/2016 |
| DE | 102016204090 A1 | 9/2017 |
| EP | 0040111 A1 | 11/1981 |
| EP | 0092952 A1 | 11/1983 |
| EP | 2556973 A1 | 2/2013 |
| EP | 2394835 B1 | 7/2013 |
| EP | 2974905 A1 | 1/2016 |
| EP | 3689720 A1 | 8/2020 |
| FR | 2062911 A1 | 7/1971 |
| FR | 2460223 B3 | 6/1982 |
| FR | 2696130 A1 | 4/1994 |
| FR | 3046592 B1 | 6/2019 |
| NL | 1035843 C | 3/2010 |
| NL | 2015873 B1 | 6/2017 |
| WO | 8602048 A1 | 4/1986 |
| WO | 03022665 A1 | 3/2003 |
| WO | 03099603 A1 | 12/2003 |
| WO | 2004074031 A1 | 9/2004 |
| WO | 2004074032 A1 | 9/2004 |
| WO | 2004101344 A2 | 11/2004 |
| WO | 2007057904 A1 | 5/2007 |
| WO | 2007062640 A2 | 6/2007 |
| WO | 2007070988 A1 | 6/2007 |
| WO | 2007132121 A1 | 11/2007 |
| WO | 2009023931 A1 | 2/2009 |
| WO | 2009141526 A2 | 11/2009 |
| WO | 2011031410 A2 | 3/2011 |
| WO | 2011031916 A2 | 3/2011 |
| WO | 2011041604 A1 | 4/2011 |
| WO | 2011062545 A1 | 5/2011 |
| WO | 2011100198 A2 | 8/2011 |
| WO | 2011108948 A1 | 9/2011 |
| WO | 2012095615 A1 | 7/2012 |
| WO | 2012125903 A2 | 9/2012 |
| WO | 2012171536 A1 | 12/2012 |
| WO | 2015185215 A1 | 12/2015 |
| WO | 2015197173 A1 | 12/2015 |
| WO | 2016023570 A1 | 2/2016 |
| WO | 2016099344 A1 | 6/2016 |
| WO | 2016116655 A1 | 7/2016 |
| WO | 2016156383 A1 | 10/2016 |

OTHER PUBLICATIONS

Gage, et al., "Low-Emission Range Extender for Electric Vehicles", SAE Transactions, 1997, pp. 3319-3328.

Jujnovich, et al., "Path-Following Steering Control for Articulated Vehicles", Journal of Dynamic Systems, Measurement, and Control, May 2013, pp. 031006-1-061006-15.

Kang, et al., "Linear Vehicle Dynamics of the Two Plow, a Steerable Articulated Snowplow, and its Kinematics-Based Steering Control", Journal of Dynamic Systems, Measurement, and Control, Aug. 2015, pp. 081004-1-081004-10.

Kang, et al., "Nonlinear Vehicle Dynamics and Trailer Steering Control of the TowPlow, a Steerable Articulated Snowplowing Vehicle System", Journal of Dynamic Systems, Measurement, and Control, Aug. 2015, pp. 081005-1-081005-13.

Ritzen, et al., "Trailer Steering Control of a Tractor—Trailer Robot", IEEE Transactions On Control Systems Technology, Jul. 2016, pp. 1240-1252.

(56) References Cited

OTHER PUBLICATIONS

Roebuck, et al., "Implementation of Trailer Steering Control on a Multi-Unit Vehicle at High Speeds", Journal of Dynamic Systems, Measurement, and Control, Mar. 2014, pp. 021016-1-021016-14.
Wahlde, "A Hitch Angle Measurement Device", Army Research Laboratory, Sep. 1998, 46 pages.

* cited by examiner

DUAL USE TRAILER VEHICLE

TECHNOLOGICAL FIELD

The present invention relates to auxiliary vehicles, particularly those configured for articulation with ordinary vehicles and other auxiliary vehicles.

BACKGROUND

One example of a modular vehicle of the kind, to which the presently disclosed subject matter refers, is described in DE 3009772.

GENERAL DESCRIPTION

According to a first aspect of the presently disclosed subject matter, there is provided a modular slave vehicle articulatable at one end thereof to another slave vehicle and at another end thereof to an independently driven master vehicle having a coupling portion, simultaneously, said slave vehicle comprising:
- a body including a driving system for driving said slave vehicle;
- a slave structural frame supporting said body, having a rear end and a front end;
- a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;
- at least one first slave coupling device mounted to said front end distal from the master coupling system; and
- at least one second slave coupling device mounted to said rear end;
- said first and second coupling devices, when mounted to two adjacent slave vehicles intended to be articulated to each other, are detachably connectable to each other to form a tandem coupling configured to constrain all DOF therebetween.

According to a second aspect of the presently disclosed subject matter, there is provided A structural frame for use with a modular slave vehicle, said structural frame being simultaneously articulatable at rear end thereof to another structural frame of a modular slave vehicle, and at a front end thereof to a coupling portion of an independently driven master vehicle, said structural frame comprising:
- a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;
- at least one first slave coupling device mounted to said front end, distal from the master coupling system; and
- at least one second slave coupling device mounted to said rear end;
- said first and second coupling devices, when mounted to two adjacent structural frames intended to be articulated to each other, are detachably connectable to each other to form a tandem coupling configured to constrain all DOF therebetween.

Any one or more of the following features, designs and configurations can be applied to a modular slave vehicle and to a structural frame for use therewith, according to the present disclosure, separately or in various combinations thereof:

The master coupling system can be configured to maintain an offset distance between said slave vehicle and said master vehicle when the two are articulated thereby, and wherein said slave coupling system is configured to maintain a second offset distance between said structural frame of said slave vehicle and a structural frame of said another slave vehicle, when the two are articulated thereby, said second offset distance being smaller than said first offset distance.

The master coupling system can comprise a shaft mounted to said front end such that it permanently protrudes axially therefrom, said shaft having a length defining said first offset distance.

The modular slave vehicle can further comprise an accommodation space closer to said rear end than said front end, configured to accommodate at least said shaft of said another slave vehicle, when the latter is articulated thereto.

The accommodation space can be bounded, at least from below, by a protective plate configured to protect said shaft from debris approaching from the ground.

The rear end of the structural frame can be higher than said front end thereof.

The accommodation space can have a horizontal length corresponding to the first offset distance minus the second offset distance.

The master coupling system can comprise three elongate members, each configured to connect independently to said coupling portion of said master vehicle, where a center elongate member is constituted by said shaft.

Two side elongate members of said three elongate members can be detachable from said structural frame.

The first and second slave coupling devices can be readily connectable to each other.

The master coupling system can comprise means for quick-connection with the coupling portion.

The means can include a hitch suitable for connection with a tow ball of said coupling portion.

The tandem coupling can be configured to facilitate quick-connection between the first and second slave coupling devices.

The tandem coupling can include a twistlock mechanism, and each of said first and second slave coupling devices comprises corresponding portions thereof.

The first and second slave coupling devices can be aligned along a coupling longitudinal axis of the modular slave vehicle.

The modular slave vehicle can further comprise a load carrying platform with a rear load carrying surface extending above said rear end of the structural frame, and a front load carrying surface extending above said front end of said structural frame, wherein said two load carrying surfaces are disposed at the same height with respect to said structural frame such that when two slave vehicles are articulated, they form a common bed therebetween.

The modular slave vehicle according to any one of the preceding claims, wherein said at least one DOF being at least partially unconstrained allows free pitch movement between said master vehicle and said slave vehicle.

The master coupling system can be configured to partially constrain roll movement between said master vehicle and slave vehicle.

The master coupling system can be configured to constrain yaw movement of said slave vehicle with respect to said master vehicle.

The master coupling system can be configured to maintain said master vehicle and said slave vehicle aligned along a common longitudinal axis.

The driving system can comprise a road engaging arrangement consisting of a pair of wheels disposed on either side of the structural frame.

The modular slave vehicle can further comprise a control system operatively connected to said driving system, said control system being configured, when said slave vehicle is articulated directly or via one or more slave vehicles to the master vehicle, to:

receive a first input signal indicative of a value of at least one driving parameter of the master vehicle, and a second input signal indicative of the number of slave vehicles between the master vehicle and the slave vehicle of the control system;

process said input signals; and produce instructions to said driving system, based on said processing, to adjust the value of a corresponding driving parameter of said slave vehicle accordingly.

The control system can be configured to receive a third input signal indicative of at least one dimension of said master vehicle, and consider all three input signals during processing.

The driving parameter can be an angle of rotation of at least one wheel of the respective vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
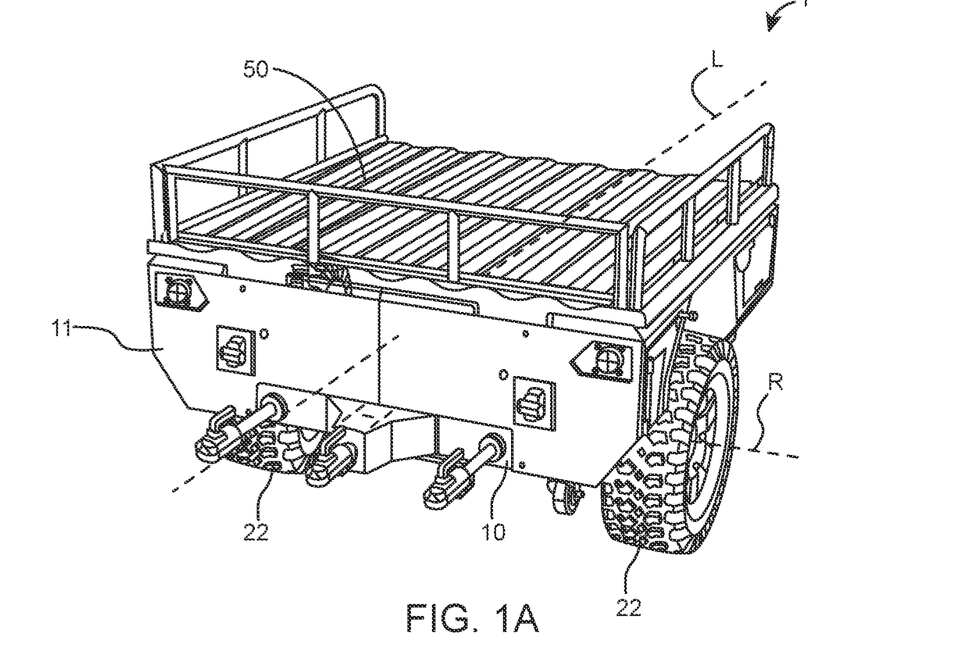
FIG. 1A is top perspective view of a modular slave vehicle according to one example of the recently disclosed subject matter.
Figure 1B:
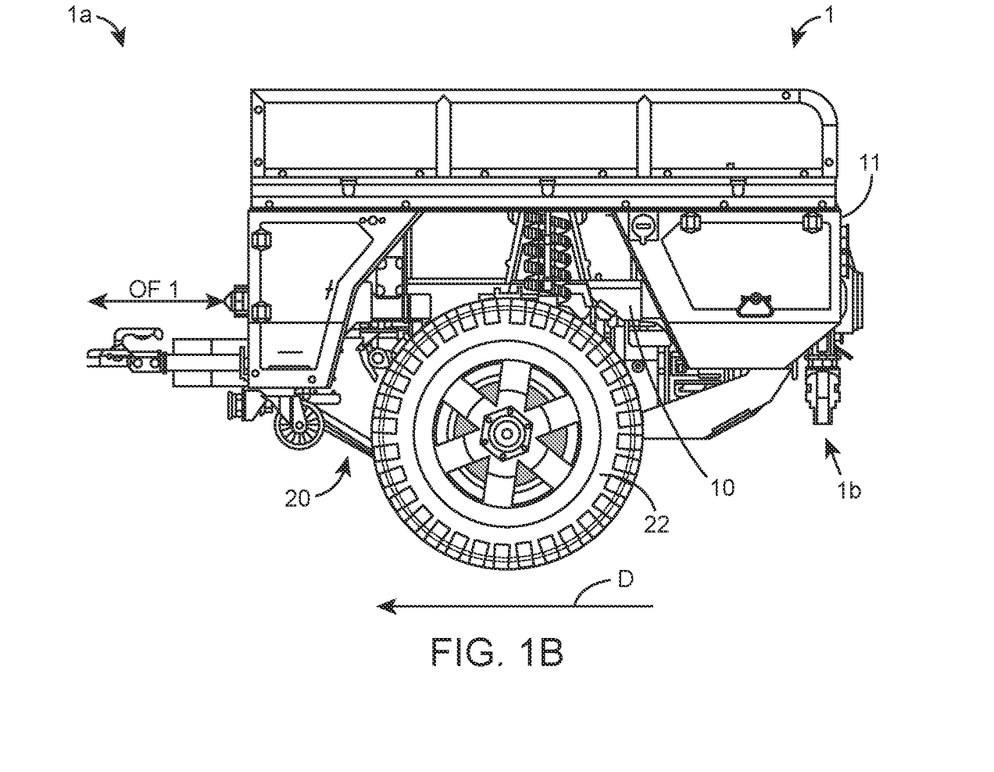
FIG. 1B is a side view of the modular slave vehicle of FIG. 1A.
Figure 1C:
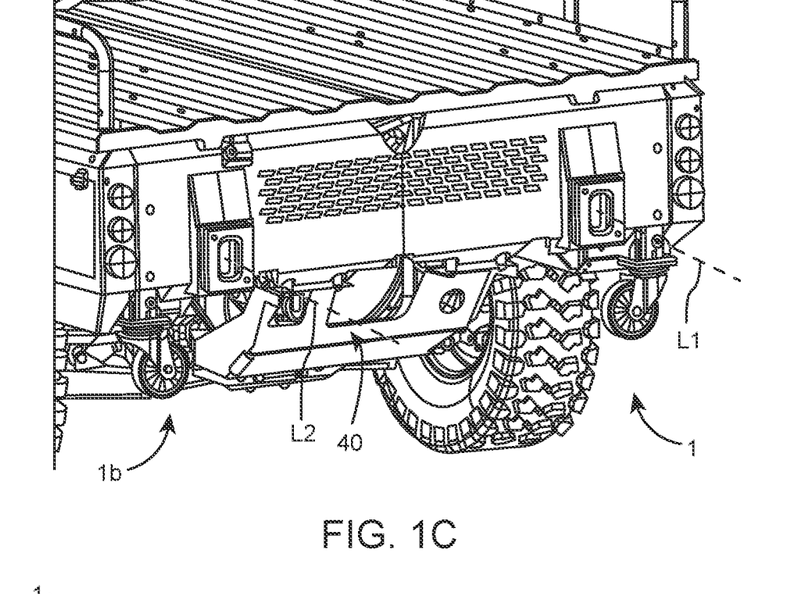
FIG. 1C is a rear perspective view of the modular slave vehicle of FIG. 1A.
Figure 1D:
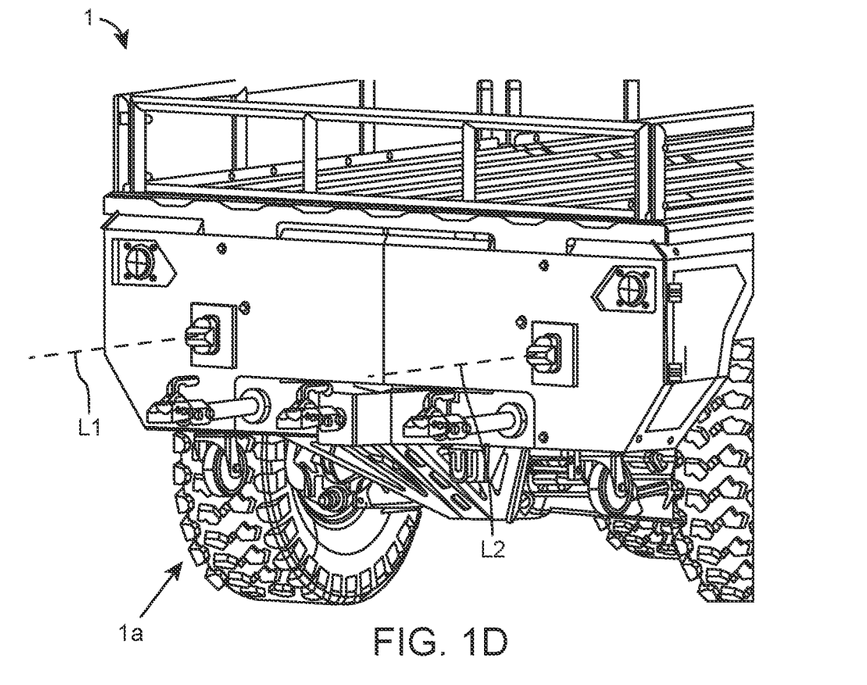
FIG. 1D is a front perspective view of the modular slave vehicle of FIG. 1A.
Figure 2A:
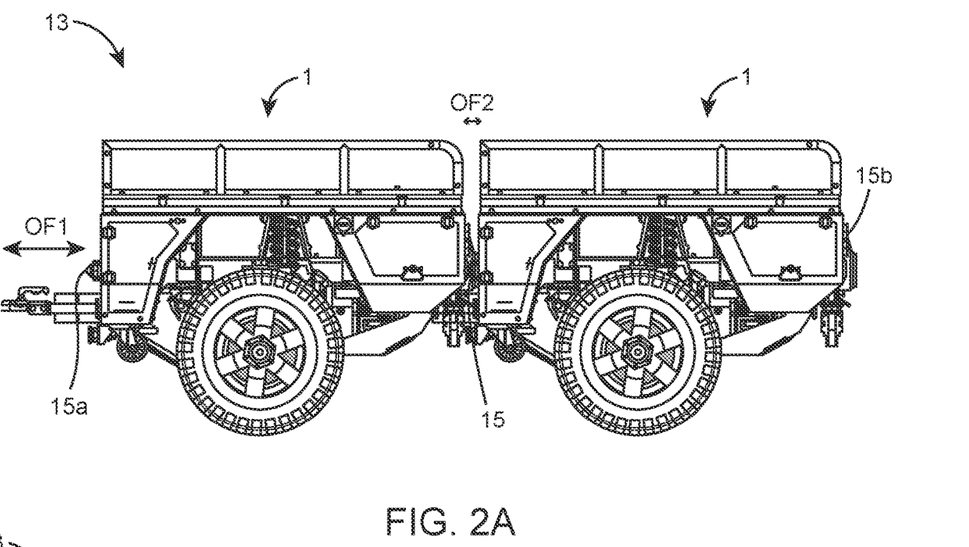
FIG. 2A is a side view of an articulated vehicle assembly comprising two slave vehicles as the slave vehicle of FIG. 1A.
Figure 2B:
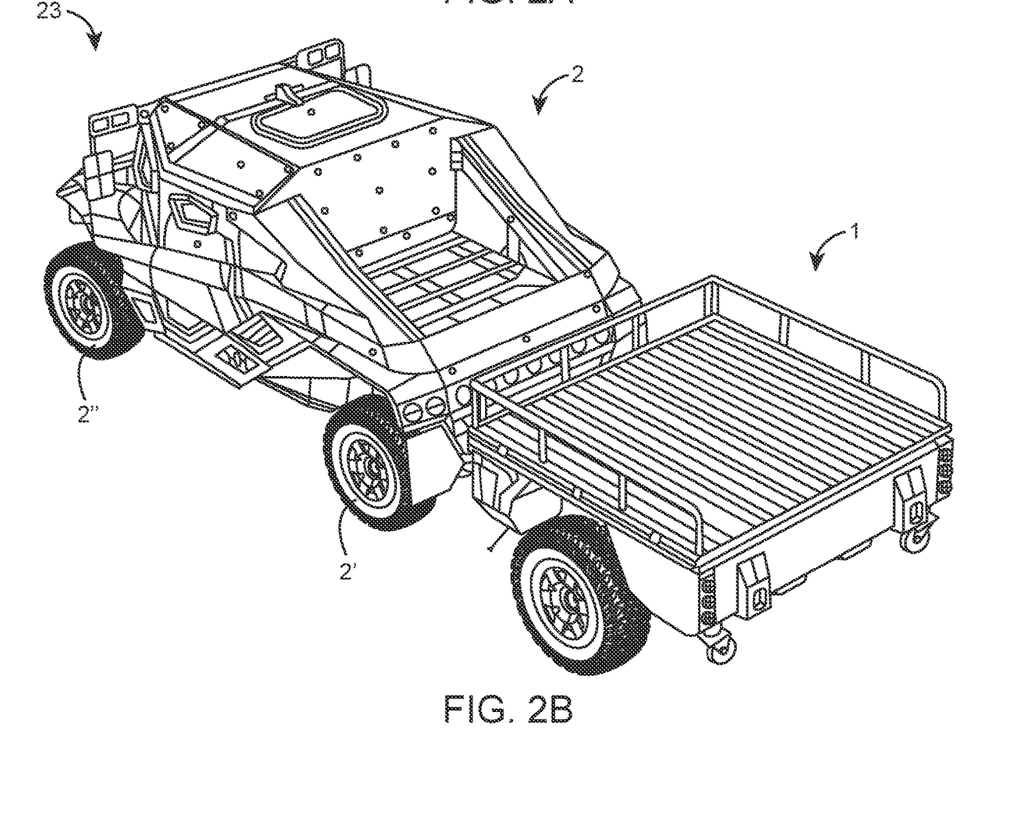
FIG. 2B is a rear perspective view of an articulated vehicle assembly comprising a master vehicle and the slave vehicle of FIG. 1A.
Figure 2C:
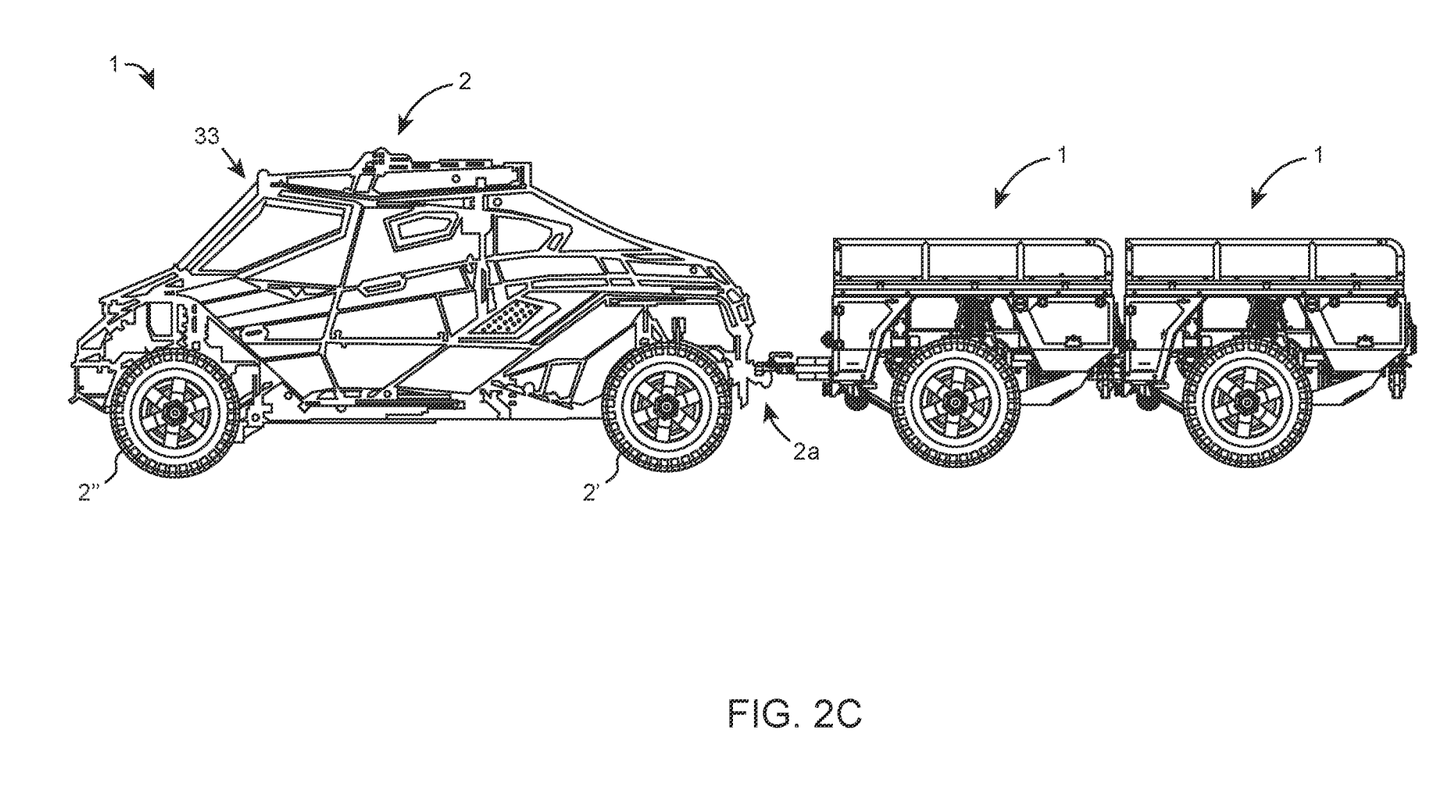
FIG. 2C is a side view of an articulate vehicle assembly comprising a master vehicle and two slave vehicles of FIG. 1A.

Attention is first directed towards FIGS. 1 and 2 of the drawings illustrating a modular slave vehicle 1, according to an example of the presently disclosed subject matter.

The slave vehicle 1 is a motorized load carrying vehicle, constituting a module for use in an articulated vehicle assembly including two or more vehicles, as illustrated in FIGS. 2A to 2C.

In particular, the modular slave vehicle 1 is configured for dual use, i.e. for articulating at a front end 1a thereof as a trailer to an ordinary state of the art master vehicle, or to a slightly modified state of the art vehicle 2, to form an articulated vehicle assembly 23 as seen in FIG. 2B, and for articulating at the front end 1a thereof and/or at a rear end 1b thereof, as either a trailer or a lead vehicle, to another, identical, slave vehicle 1, to form an articulated vehicle assembly 13 consisting of slave vehicles as seen in FIG. 2A.

The master vehicle 2 can be manned or unmanned, and can be articulated to the slave vehicle 1 via a coupling portion 2a thereof, of which an example will be described hereinafter in more detail.

The slave vehicle 1 can also be simultaneously articulated at the front end 1a thereof to the manned vehicle 2, and at the rear end thereof 1b to another slave vehicle 1, to form an articulated vehicle assembly 33 as seen in FIG. 2C.

In turn, the another slave vehicle 1 can be articulated to yet another slave vehicle 1 at its free end, and so on, until driving in the manned vehicle 2 becomes too difficult for a driver thereof.

Each of the articulated vehicle assemblies 13, 23, 33, enables independent driving thereof, i.e., without being articulated to any other vehicle. While at the assemblies 23,23 the master vehicle 2 is constantly the leading vehicle (expect while driving in reverse), at the assembly 13, any one of the slave vehicles 1 can be constituted as a leading vehicle.

It should be appreciated that the slave vehicle 1 is configured for military purposes, i.e., configured to be functional for off-road articulated driving at high speeds. When too many slave vehicles are articulated to the manned vehicle 2, driving off-road at high speed may cause instabilities in the articulated vehicle assembly.

With such arrangement, one or more slave vehicles 1 can drive to a destination while articulated to the master vehicle 2, and upon arrival, deploy, i.e., split, to individual units. Individual units including two or more slave vehicles 1 can drive independently at the destination to pre-determined deployment locations thereof, while individual units including a single slave vehicle 1 can reach their deployment locations articulated to the master vehicle 2 or to a master vehicle/one or more slave vehicles of another articulated vehicle assembly arriving to the destination.

It should be appreciated that the modular slave vehicle 1 can include a self mobility aid system configured to facilitate independent limited maneuverability therefore, particularly for enabling an operator to slightly push or pull the modular slave vehicle 1 on top of comfortable ground and to a short distance, while the slave vehicle 1 is not articulated to any other vehicle.

Figure 3:
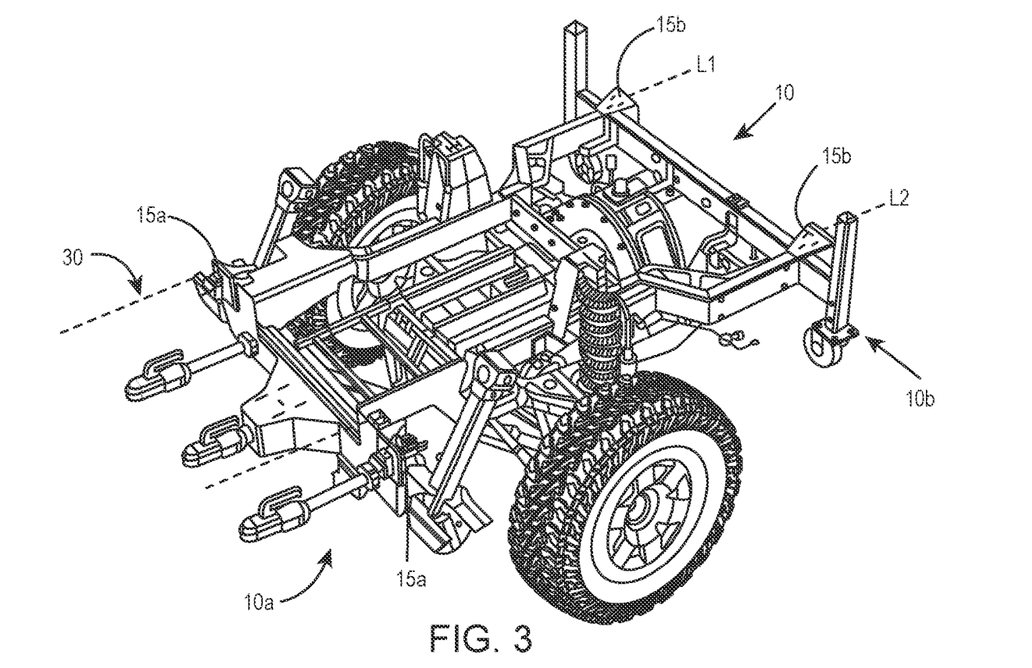
FIG. 3 is a top perspective view of a structural frame of the slave vehicle of FIG. 1A.

The slave vehicle 1 comprises a slave structural frame, here in the form of chassis 10 (seen in greater detail in FIG. 3), supporting a body 11 thereof and mounted with a plurality of coupling devices and mechanisms, as will be explained hereinafter.

In other embodiments of the presently disclosed subject matter, the slave structural frame can be constituted by another known in the art structure useful for supporting vehicles, e.g., a spaceframe, a unibody frame, etc.

The chassis 10 has a rear end 10b and a front end 10a, and is configured to support the body 11 of the slave vehicle 1 within their boundaries. In other embodiments of the presently disclosed subject matter, the body 11 can extend beyond the chassis 10.

The front end 10a is mounted with a master coupling system in the form of a mechanical stress absorbing coupling mechanism 30, via which the slave vehicle 1 is configured to detachably articulate to the master vehicle 2, (seen in greater detail in FIG. 4) and with two first slave coupling devices 15a, via which the slave vehicle 1 is configured to be articulated to another slave vehicle 1 at its front, while not articulated to the master vehicle 2.

The rear end 10b is mounted with two second slave vehicle couplings 15b, via which the slave vehicle 2 is configured to be articulated to another slave vehicle at its rear.

As can be understood, the master coupling system 30 is mounted only to the front end 10a of the chassis 10, as the slave vehicle 1 is designed for driving forward at high speeds, i.e., in the direction D from the rear end 1b to the front end 1a thereof, and such high speeds are expected to be reached when the slave vehicle 1 is articulated to the master vehicle 2, which can be configured for driving independently at high speeds.

For enabling comfortable driving for the manned vehicle 2 while one or more slave vehicles, such as slave vehicle 1, are articulated thereto, the master coupling system 30 is designed to damp stresses being transmitted from the slave vehicle 1 to the manned vehicle 1, and vice versa. The damping herein is performed by partially allowing relative movement between the master vehicle 2 and the one or more slave vehicles 1 connected thereto, particularly by leaving some rotational Degrees Of Freedom therebetween unconstrained or partially constrained, as will be explained hereinafter.

To further enable comfortable driving of the master vehicle 2 when articulated to two or more slave vehicles, as in the assembly 33 of FIG. 2C, the first and second slave coupling devices 15a,15b, are designed to connect with each other to form a tandem coupling 15 constraining all DOF between the vehicles.

Such articulation renders the chassis 10 of the two or more slave vehicles 1 unified, and thereby facilitates a single area of free relative movement in the articulated vehicle assembly 33, i.e., between the master vehicle 2 and the first slave vehicle 1 connected thereto, contributing to the overall stability and intactness of the articulated vehicle assembly 33, particularly while driving at high speed and on rough terrain.

Such articulation also contributes to stability and intactness of an articulated vehicle assembly consisting of two or more slave vehicles, such as the assembly 13 of FIG. 2A, and for the ability thereof to carry common load spreading between the vehicles, as will be explained hereinafter.

To be able to connect when mounted to two identical slave vehicles 1, each of the first slave coupling devices 15a is aligned with its respective second slave coupling device 15b, along a common longitudinal axis L1,L2, extending symmetrically on either side of a central longitudinal axis L of the slave vehicle 1.

It should be appreciated that the slave vehicle 1 is a motorized vehicle having a driving system 20 with a motor (not seen) and road engaging members in form of two steerable and propellable wheels 22 operatively connected thereto at either side thereof. The driving system 20 enables the slave vehicle 1 to drive an articulated vehicle assembly consisting of slave vehicles, such as the assembly 13 of FIG. 2A, or ease articulated driving for the master vehicle 2, as will be explained hereinafter.

As such, in an assembly of two or more slave vehicles, as the assembly 13 of FIG. 2a, any one of the driving systems 20 of the vehicles 1 can operate alone to propel the assembly 13 while the other is passive, or be operated in conjunction with the other driving system 20 to render the assembly 13 a 4×4 drive, depending on the operative need, and the control system available for operating the assembly 13. In general, when more than two slave vehicles 1 are articulated together to form an articulated vehicle assembly, their driving system can facilitate n×n driving, where n stands for the number of wheels in the articulated vehicle assembly.

In other embodiments of the presently disclosed subject matter the road engaging members can be constituted by caterpillar tracks, ski slides, or any other known road engaging member useful for advancing vehicles.

The two wheels 22 herein are symmetrically aligned on either side of the slave vehicle 1, such that they share a common rotation axis R at a straight orientation thereof, seen in the figures.

Having merely two wheels 22, contributes to the stability of the slave vehicle 1 during driving, as it limits the location of sudden impacts from the road. When one or more slave vehicles 1 are articulated to the master vehicle 2, as in the assembly 23, having merely two wheels in each slave vehicle 1 contributes to the overall stability of the assembly 23 as described. Further, the distance of the wheels 22 from rear wheels 2' of the master vehicle 2, is also important for keeping the assembly 23 stable, and particularly may not exceed the distance between the rear wheels 2' of the master vehicle 2, and a front wheels 2" thereof. As the wheels 22 of the slave vehicle 1 are fixed in their position, the distance between them and the rear wheels 2' of the master vehicle 2 is determined by the couplings therebeween, and between slave vehicles when more than one is articulated thereto.

As can be seen in the figures, the master coupling system 30 has an operative length maintaining an offset distance OF1 between the front end 10a of the chassis 10 of the slave vehicle 1 and the coupling portion 2a of the manned vehicle 2.

The offset distance OF1 enables pitch of one vehicle towards the other, and facilitates length for damping stresses passing between the vehicles.

As can be also seen in the figures, the tandem coupling 15 has a second operative length maintaining a second offset distance OF2 between the structural frames 10 of the respective slave vehicles 1 connected thereby. The second offset distance OF2 enables minor movements of non-structural elements of the two slave vehicles with respect to each other.

To facilitate comfortable driving in the master vehicle 2 when two or more slave vehicles 1 are articulated thereto, the two offset distances, and particularly the second offset distance OF2 should be minimal as possible, much shorter than the offset distance OF1, and particularly minimal to allow the rotation axes R of the wheels 22 of the respective slave vehicles 1 to come as close together as possible, and thereby increase the stability of the entire structure, particularly at high speeds, and limit the development of moment forces throughout the along the articulated vehicle assembly.

Figure 4:
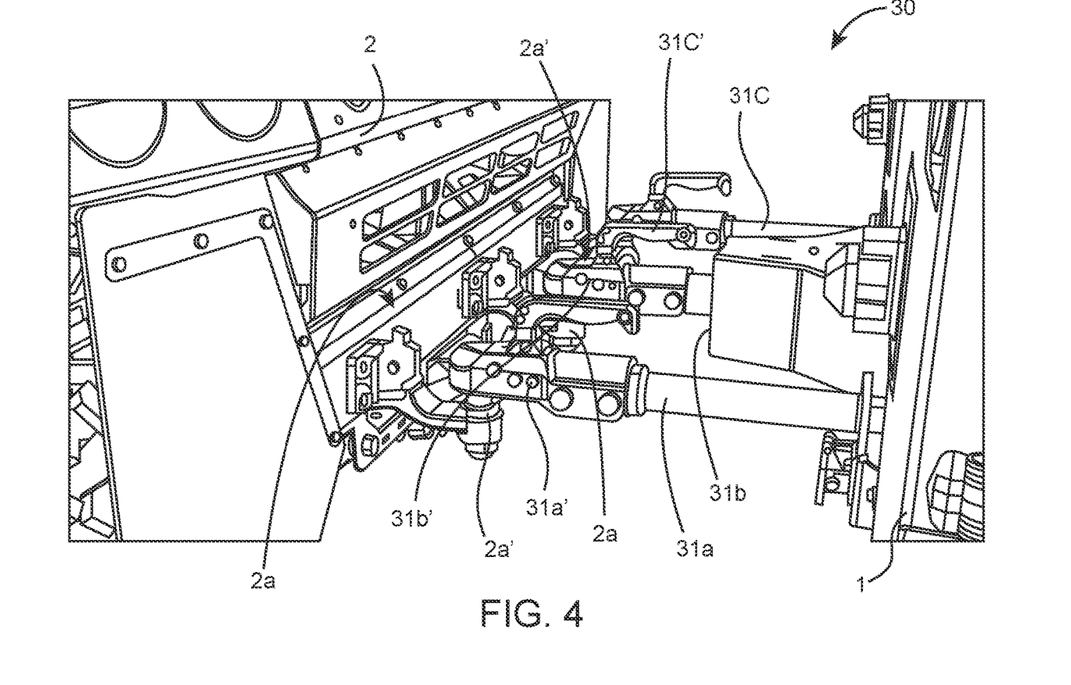
FIG. 4 is a front perspective view of a master coupling system of the slave vehicle of FIG. 1A.

Attention is now directed to FIG. 4 of the drawings, showing a close up view of the stress absorbing coupling 30 as it articulates the slave vehicle 1 and the manned vehicle 2 together.

As can be seen, the stress absorbing coupling 30 comprises three elongate members 31a, 31b, and 31c, where a length of which defines the offset distance OF1.

Figure 5:
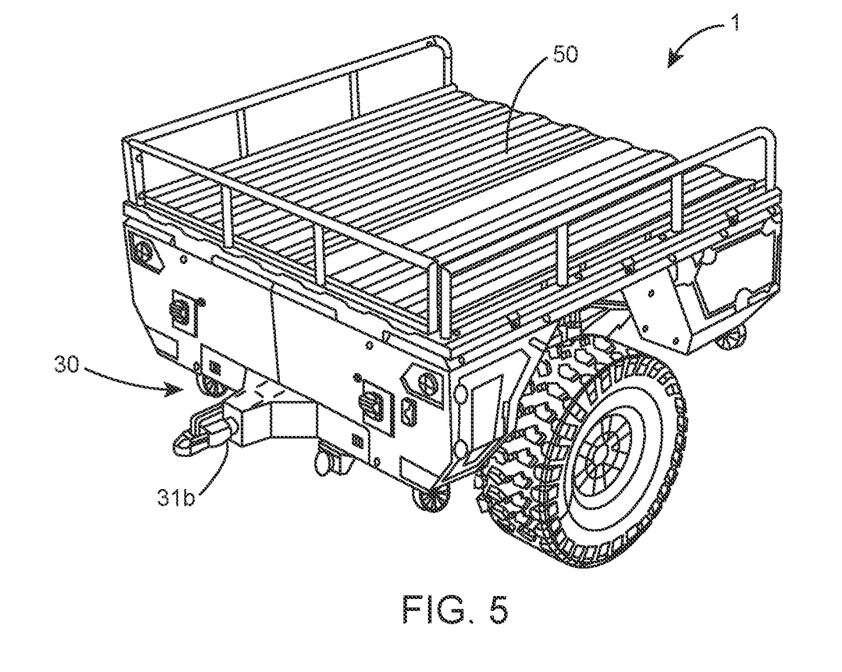
FIG. 5 is a front perspective view of the slave vehicle of FIG. 1A with two elongate members of the coupling system of FIG. 4 detached therefrom.

The two side elongate members 31a and 31c being detachable from the slave vehicle 1, as seen in FIG. 5, while the central elongate member 31b, constituted by a shaft 31b herein, is permanently welded to the chassis 10, protruding axially, i.e., along the longitudinal axis L of the slave vehicle 1, and particularly normally horizontally therefrom.

As mentioned, the slave vehicle 1 is a directional vehicle configured to maintain a forward orientation, i.e., with the elongate members 31a,31b, and 31c protruding frontally thereto.

As such, in an articulated vehicle assembly of two or more slave vehicles, those elongate members, and particularly the central elongate member 31b, can interrupt close articulation of the slave vehicles 1.

Figure 6:
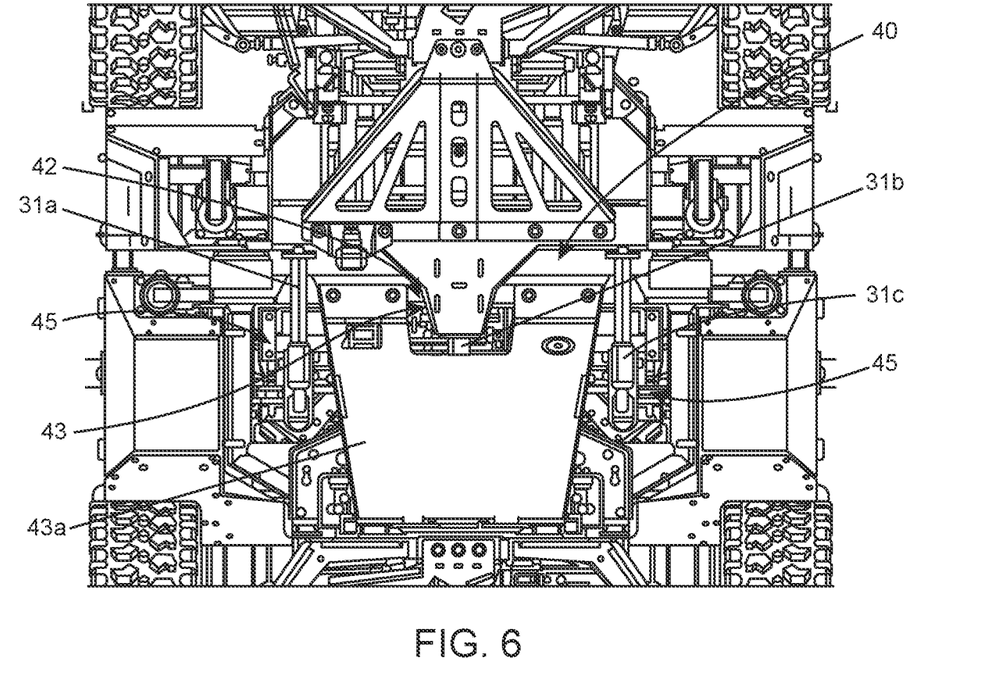
FIG. 6 is a bottom view of two slave vehicles 1 articulated to one another, with the master coupling system of one vehicle received within an accommodation space of the other vehicle.

For overcoming such, the slave vehicle 1 comprises an accommodation space 40, best seen in FIG. 6, configured to accommodate the elongate members 31a,31c, and 31c, therein. Such arrangement allows the slave vehicle 1 to articulate with another slave vehicle 1 at its front, while maintaining the second offset distance OF2 between the vehicles chassis 10 shorter than the first offset distance OF1.

The accommodation space 40 is disposed at the rear end 1b of the vehicle 1, with an opening 42 facing normally away from the rear end 1b. To accommodate the elongate members, the openings 42 have dimensions corresponding to those of the elongate members 31a, 31b, and 31c, and are disposed at the same height as the elongate members 31a, 31b, 31c, with respect to a lowermost portion of the wheels 22. To facilitate maximal accommodation therein, the horizontal length of the accommodation space 42 corresponds to the length of the elongate members 31a,31b,31c, and particularly to the length of the shaft 31b.

The accommodation space 40 comprises a central protected zone 43 configured to receive and accommodate the central shaft 31b. The central protected zone 43 is bounded from below by a protective plate 43a protecting anything within the protected zone 43 from debris approaching from the ground.

The accommodation space 40 further comprises two open areas 45 configured to accommodate the side elongate members 31a and 31c. It should be appreciated that the central shaft 31b, being welded to the chassis 10, is a rigid structure which, during driving, should not be subject to bouncing relatively to the chassis 10, and therefore can be bounded within a protected space. On the other hand, the side elongate members 31a and 31c are detachably connectable to the chassis 10, as seen in FIG. 4B, and may even comprise flexible portions, are very much subject to bouncing and preforming any other form of relative movement with respect to the chassis 10 during driving.

As such, the open areas 45 have dimensions which are substantially greater than those of the elongate members 31a and 31c, and particularly corresponding to the expected disposition of the edges of the elongate members 31a and 31c, during driving.

In other embodiments of the presently disclosed subject matter, all three elongate members 31a, 31b, and 31c, can be fixedly connected to the chassis 10, and the protective plate 43a can spread throughout the accommodation space 40, to define a greater protected area 43 capable of accommodating all three elongate members.

To facilitate that accommodation space 40, the rear end 10b of the structural frame 10 has a different shape than the front end 10a thereof, namely, a shape bypassing the accommodation space 40. Herein, the rear end 10b of the structural frame 10 is higher than the front end 10a of the structural frame 10, so that the accommodation space 40 could be defined at the same height as the elongate members 31a, 31b,31c, with respect to a lowermost portion of the wheels 22.

It should be appreciated that the driving system 20 of one or more slave vehicles 1 can be adapted to not harm driving capabilities of the master vehicle 2, when the one or more slave vehicles 1 are articulated thereto.

In particular, the slave vehicle 1 can be configured to drive at the same speed as the manned vehicle 2, to not damage acceleration and maximal speed of the master vehicle 2. The slave vehicle can also be configured to turn its wheels 22 in conjunction with the front wheels of 2" of the manned vehicle 2, to not damage the Instant center of rotation of the master vehicle 2. When more than one slave vehicle 1 is connected to the master vehicle 2, the driving system 20 of each of the slave vehicles 1 can be configured to consider the respective location of the slave vehicle on which it is mounted, i.e., the distance from the rear 2' wheels of the master vehicle 2, and adjust the rotation of its wheels 22 to not damage the natural ICOR of the master vehicle 2.

The slave vehicle 1 can further comprise a control system 80 operatively connected to said driving system 20, so as to control driving thereof, as described hereinabove.

Figure 8:
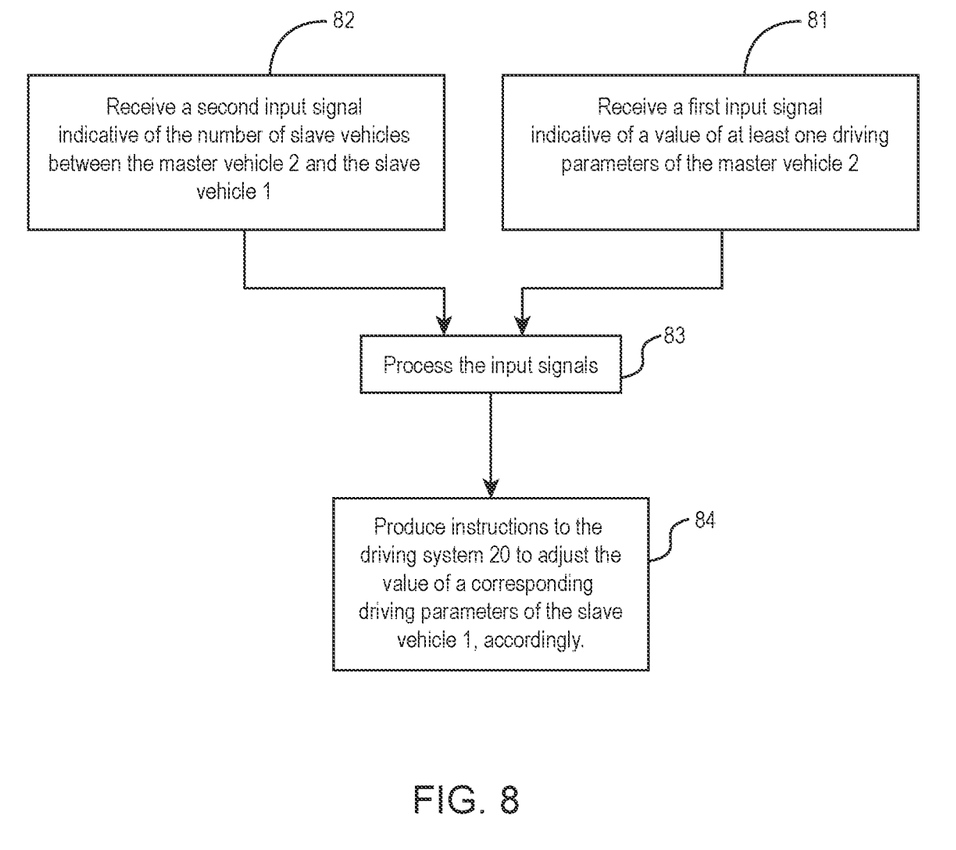
FIG. 8 is a schematic flow chart demonstrating the operation of a control system of the slave vehicle of FIG. 1A.

The control system 80, having an operational flow described in FIG. 8, can be configured, when the slave vehicle 1 is articulated directly or via one or more other slave vehicles such as 1 to the master vehicle 2, to drive the slave vehicle 1 based on the current position thereof with respect to the master vehicle 2, and optionally the type of master vehicle being used, particularly the distance between the steerable and non-steerable wheels thereof. in particular, the control system 80 is configured to 81 receive, optionally via a can-bus network, a first input signal indicative of a value of at least one driving parameter of the master vehicle 2, e.g., instant angle of rotation of its steerable wheels 2", and receive 82 a second input signal indicative of the number of slave vehicles between the master vehicle 2 and the slave vehicle 1 of the control system. In case where the slave vehicle 1 is articulated directly to the master vehicle 2, that number of vehicles would be 0.

The control system 80 is further configured to process 83 those input signals, and produce in response instructions to the driving system 20, based on said processing, to adjust the value of a corresponding driving parameter, e.g., angle of wheels 22 of the slave vehicle 1, accordingly.

According to an example of the presently disclosed subject matter, the master vehicle comprises a monitoring system in communication with a can-bus network to which the control system 80 of the slave vehicle 1 can also connect. In such a case, the can-bus network can share between the vehicles all necessary information for instructing the wheels of the slave vehicle 1. According to that example, the control system 80 can be configured to receive a third input signal indicative of at least one dimension of the master vehicle, e.g., the distance between the front and rear wheels thereof 2", 2' and consider all three input signals during processing.

In general, the control system 80 can be configured to consider all three inputs to determine the Instant Center Of Rotation of the master vehicle 2, and instruct the driving system 20 to steer the wheels 22 in a manner maintaining that for the entire articulated vehicle assembly.

As such, for a master vehicle having non-steerable rear wheels, such as the vehicle 2, to be able to drive comfortably, the distance between the wheels of the slave vehicle being articulated directly thereto, and the wheels of the rearmost slave vehicle, should not exceed the distance between the front steerable wheels and the rear non steerable wheels of the master vehicle.

In the examples shown herein, the maximal number of slave vehicles articulable to the master vehicle 2 in a manner allowing comfortable driving therefore is two.

It should be further appreciated that by means of the master coupling system 30, the driving system 20 of one or more slave vehicles 1 can assist in driving the master vehicle 2, when the one or more slave vehicles 1 are articulated thereto.

In particular, the mechanical stress absorbing coupling mechanism 30 is designed to allow free pitch movement, and partially restrict roll and yaw movements, of one vehicle with respect to the other, such that the vehicles articulated thereby are maintained aligned along the longitudinal axis L, while the translational DOF remain fully constrained.

The constraining of translational DOF's allows the slave vehicle 1 to hold back the master vehicle 2 using its brakes, while the restriction of yaw and roll movements allows the slave vehicle 1 to push the master vehicle 2.

According to an example of the presently disclosed subject matter, the mechanical stress absorbing coupling mechanism 13 is constituted by the articulation system disclosed in US 2020/0062306, and the content of which is incorporated herein by reference.

It should be appreciated that each of the stress absorbing coupling mechanism 13, the female coupling device 15a, and the male coupling device 15b, is readily connectable to its respective coupling by a quick-connect mechanism, i.e., without performing any modifications thereof, without adding external parts to it, and optionally without using designated tools, thereby rendering the slave vehicle 1 a readily usable module for both uses abovementioned.

Such quick-connect allows intuitive articulation and inarticulation of the slave vehicle 1 to the master vehicle 2 and to another slave vehicle 1, in field, by untrained personnel, rendering it suitable for combat missions.

In the examples shown herein, the tandem coupling 15 is constituted by a twistlock mechanism. The second coupling device 15b is constituted by a female, hollow casting 15b with an elongate hole 15b' in its front face 15b", while the first coupling device 15a is constituted by a male, twistlock, having an elongate locking portion 15a' configured to be inserted through the hole 15a" and be rotated, optionally by 90°, within the hollo so it cannot be withdrawn out therefrom.

Similarly, the three elongate members 31a,31b, 31c, each comprise a coupling head in the form of a hitch 31a', 31b', 31c', at its distal end from the vehicle 1, suitable for connection with a tow ball.

In turn, the coupling portion 2a of the manned vehicle 2, includes three tow balls 2a' spaced apart to a distance corresponding to the distance between hitches 31a',31b', 31c', to which the hitches are configured to connect.

It should be appreciated that although most ordinary vehicles typically include 1 tow ball or no tow ball at all, modifying an ordinary vehicle to include such, is relatively easy to perform, particularly when compared to modifying a vehicle to include equipment which can be carried by the slave vehicle 1, e.g., military antenna. As such, the slave vehicle 1 redundance the need for extreme modification of vehicles to be able to carry particular load, as it can carry the load in itself and be connected to any slightly modified ordinary vehicle.

In other embodiments of the presently disclosed subject matter the coupling portion 2a can include any other means of articulation corresponding to the master coupling system 30 of the slave vehicle 1.

The slave vehicle 1 herein is configured to carry load. The load can be in any form e.g., heavy military equipment such as antennas, radar devices, supply containers, etc. The load can be joined integrally to the slave vehicle 1, i.e., by welding thereof to the chassis 10 of the slave vehicle, or be detachably mounted thereto.

Figure 7A:
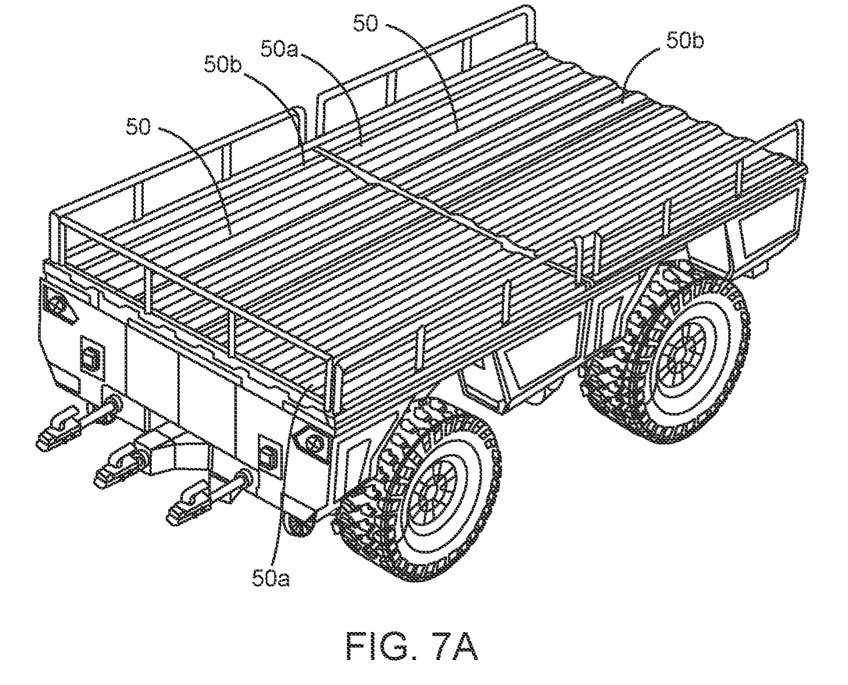
FIG. 7A is a top perspective view of two slave vehicles articulated to one another such that their load carrying platforms form a common bed together.
Figure 7B:
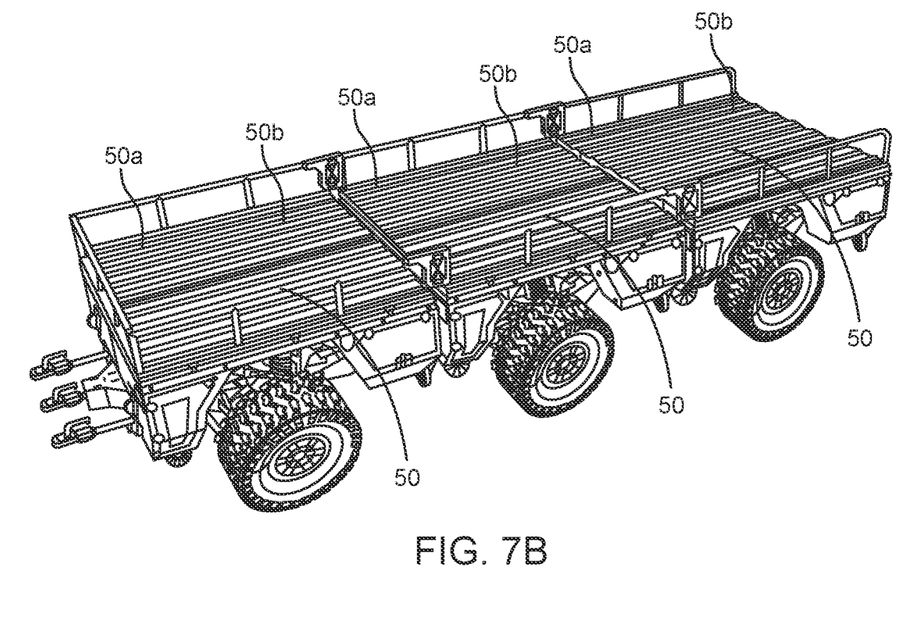
FIG. 7B is a top perspective view of three slave vehicles articulated to one another such that their load carrying platforms form a common bed together.

To facilitate carrying of detachable load, the slave vehicle 1 comprises a load carrying platform 50 with a rear load carrying surface 50b extending above the rear end 10b of the chassis 10, and a front load carrying surface 50a extending above the front end 10a of the chassis. As can be seen in the figures, the two load carrying surfaces 50a and 50b are disposed at the same height with respect to the lowermost portion of the wheels 22, such that when two slave vehicles 1 are articulated to one another, as seen in FIGS. 7A and 7B they form a common bed therebetween configured for carrying common load.

In the example shown herein, the platform 50 is horizontally balanced such that all surfaces thereof are of the same height.

The invention claimed is:

1. A modular slave vehicle articulatable at one end thereof to another slave vehicle and at another end thereof to an independently driven master vehicle having a coupling portion, simultaneously, said modular slave vehicle comprising:
   a body including a driving system for driving said modular slave vehicle;
   a slave structural frame supporting said body, having a rear end and a front end;
   a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;
   at least one first slave coupling device mounted to said front end distal from the master coupling system;
   at least one second slave coupling device mounted to said rear end;
   wherein said first and second coupling devices, when mounted to two adjacent slave vehicles intended to be articulated to each other, are detachably connectable to each other to form a tandem coupling configured to constrain all DOF therebetween;
   wherein said master coupling system is configured to maintain an offset distance between said slave vehicle and said master vehicle when the two are articulated thereby, and wherein said slave coupling system is configured to maintain a second offset distance between said structural frame of said slave vehicle and a structural frame of said another slave vehicle, when the two are articulated thereby, said second offset distance being smaller than said first offset distance;

wherein said master coupling system comprises a shaft mounted to said front end such that it permanently protrudes axially therefrom, said shaft having a length defining said first offset distance; and an accommodation space closer to said rear end than said front end, configured to accommodate at least said shaft of said another slave vehicle, when the latter is articulated thereto.

2. The modular slave vehicle according to claim 1, wherein said accommodation space is bounded, at least from below, by a protective plate configured to protect said shaft from debris approaching from the ground.

3. The modular slave vehicle according to claim 1, wherein said master coupling system comprises three elongate members, each configured to connect independently to said coupling portion of said master vehicle, where a center elongate member is constituted by said shaft.

4. The modular slave vehicle according to claim 3, wherein two side elongate members of said three elongate members are detachable from said structural frame.

5. The modular slave vehicle according to claim 1, wherein said master coupling system comprises means for quick-connection with said coupling portion.

6. The modular slave vehicle according to claim 5, wherein said means include a hitch suitable for connection with a tow ball of said coupling portion.

7. The modular slave vehicle according to claim 1, wherein said tandem coupling is configured to facilitate quick-connection between the first and second slave coupling devices.

8. The modular slave vehicle according to claim 7, wherein said tandem coupling includes a twistlock mechanism, and each of said first and second slave coupling devices comprises corresponding portions thereof.

9. The modular slave vehicle according to claim 1, wherein said first and second slave coupling devices are aligned along a coupling longitudinal axis of the modular slave vehicle.

10. The modular slave vehicle according to claim 1, further comprising a load carrying platform with a rear load carrying surface extending above said rear end of the structural frame, and a front load carrying surface extending above said front end of said structural frame, wherein said two load carrying surfaces are disposed at the same height with respect to said structural frame such that when two slave vehicles are articulated, they form a common bed therebetween.

11. The modular slave vehicle according to claim 1, wherein said at least one DOF being at least partially unconstrained allows free pitch movement between said master vehicle and said slave vehicle.

12. The modular slave vehicle according to claim 1, further comprising a structural frame being simultaneously articulatable at rear end thereof to another structural frame of the modular slave vehicle, and at a front end thereof to a coupling portion of an independently driven master vehicle, said structural frame comprising:

a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;

at least one first slave coupling device mounted to said front end, distal from the master coupling system; and at least one second slave coupling device mounted to said rear end;

wherein said first and second coupling devices, when mounted to two adjacent structural frames intended to be articulated to each other, are detachably connectable to each other to form a tandem coupling configured to constrain all DOF therebetween.

13. A modular slave vehicle articulatable at one end thereof to another slave vehicle and at another end thereof to an independently driven master vehicle having a coupling portion, simultaneously, said modular slave vehicle comprising:

a body including a driving system for driving said modular slave vehicle;

a slave structural frame supporting said body, having a rear end and a front end;

a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;

at least one first slave coupling device mounted to said front end distal from the master coupling system; and at least one second slave coupling device mounted to said rear end;

wherein said first and second coupling devices, when mounted to two adjacent slave vehicles intended to be articulated to each other, are detachably connectable to each other to form a tandem coupling configured to constrain all DOF therebetween;

wherein said tandem coupling is configured to facilitate quick-connection between the first and second slave coupling devices;

wherein said tandem coupling includes a twistlock mechanism, and each of said first and second slave coupling devices comprises corresponding portions thereof.

14. A modular slave vehicle articulatable at one end thereof to another slave vehicle and at another end thereof to an independently driven master vehicle having a coupling portion, simultaneously, said modular slave vehicle comprising:

a body including a driving system for driving said modular slave vehicle;

a slave structural frame supporting said body, having a rear end and a front end;

a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;

at least one first slave coupling device mounted to said front end distal from the master coupling system;

at least one second slave coupling device mounted to said rear end; and a load carrying platform with a rear load carrying surface extending above said rear end of the structural frame, and a front load carrying surface extending above said front end of said structural frame, wherein said two load carrying surfaces are disposed at the same height with respect to said structural frame such that when two slave vehicles are articulated, they form a common bed therebetween;

wherein said first and second coupling devices, when mounted to two adjacent slave vehicles intended to be articulated to each other, are detachably connectable to each other to form a tandem coupling configured to constrain all DOF therebetween.

15. A modular slave vehicle articulatable at one end thereof to another slave vehicle and at another end thereof to an independently driven master vehicle having a coupling portion, simultaneously, said modular slave vehicle comprising:

a body including a driving system for driving said modular slave vehicle;

a slave structural frame supporting said body, having a rear end and a front end;

a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;

at least one first slave coupling device mounted to said front end distal from the master coupling system; and at least one second slave coupling device mounted to said rear end;

wherein said first and second coupling devices, when mounted to two adjacent slave vehicles intended to be articulated to each other, are detachably connectable to each other to form a tandem coupling configured to constrain all DOF therebetween;

wherein said rear end of said structural frame is higher than said front end thereof.

16. The modular slave vehicle according to claim 15, wherein said accommodation space has a horizontal length corresponding to the first offset distance minus the second offset distance.

17. A modular slave vehicle articulatable at one end thereof to another slave vehicle and at another end thereof to an independently driven master vehicle having a coupling portion, simultaneously, said modular slave vehicle comprising:

a body including a driving system for driving said modular slave vehicle;

a slave structural frame supporting said body, having a rear end and a front end;

a master coupling system in the form of a mechanical stress absorbing coupling mechanism mounted to said front end, said master coupling system being detachably articulatable to said coupling portion of the master vehicle so as to constrain, at least partially, all translational DOF of the vehicles relatively to each other, and leave at least one rotational DOF at least partially unconstrained;

at least one first slave coupling device mounted to said front end distal from the master coupling system; and at least one second slave coupling device mounted to said rear end;

a control system operatively connected to said driving system, said control system being configured, when said slave vehicle is articulated directly or via one or more slave vehicles to the master vehicle, to:
  receive a first input signal indicative of a value of at least one driving parameter of the master vehicle, and a second input signal indicative of the number of slave vehicles between the master vehicle and the slave vehicle of the control system;
  process said input signals; and
  produce instructions to said driving system, based on said processing, to adjust the value of a corresponding driving parameter of said slave vehicle accordingly;
  wherein said control system is configured to receive a third input signal indicative of at least one dimension of said master vehicle, and consider all three input signals during processing.

18. The modular slave vehicle according to claim 17, wherein said driving parameter is an angle of rotation of at least one wheel of the respective vehicle.

* * * * *